United States Patent
Layman et al.

(10) Patent No.: US 7,069,335 B1
(45) Date of Patent: Jun. 27, 2006

(54) METHOD AND SYSTEM FOR EXCHANGING MESSAGES BETWEEN ENTITIES ON A NETWORK COMPRISING AN ACTOR ATTRIBUTE AND A MANDATORY ATTRIBUTE IN THE HEADER DATA STRUCTURE

(75) Inventors: Andrew J. Layman, Bellevue, WA (US); Gopal Krishna R. Kakivaya, Sammamish, WA (US); Satish R. Thatte, Redmond, WA (US); Henrik F. Neilsen, Seattle, WA (US); Robert George Atkinson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 526 days.

(21) Appl. No.: 09/636,003

(22) Filed: Aug. 9, 2000

Related U.S. Application Data

(60) Provisional application No. 60/193,585, filed on Mar. 30, 2000, provisional application No. 60/148,172, filed on Aug. 10, 1999.

(51) Int. Cl.
  *G06F 15/16* (2006.01)
  *G06F 15/173* (2006.01)
(52) U.S. Cl. ............ 709/238; 709/202; 709/206; 709/205
(58) Field of Classification Search ........ 709/204–207, 709/224, 230, 232, 236–238, 242, 245, 248, 709/317; 379/88.14; 358/1.15
See application file for complete search history.

(56) References Cited

U.S. PATENT DOCUMENTS 3,825,905 A * 7/1974 Allen, Jr. .................... 709/248

(Continued)

OTHER PUBLICATIONS

Connolly, D.; RFC 1866: Hypertext Markup Language—2.0; Nov. 1995.*

(Continued)

*Primary Examiner*—Rupal Dharia
*Assistant Examiner*—Quang N. Nguyen
(74) *Attorney, Agent, or Firm*—Lee & Hayes, PLLC

(57) ABSTRACT

Using a message exchanger ("message exchanger"), data messages are exchanged between entities in a decentralized, distributed, potentially heterogeneous, network environment. The message exchanger employs XML (extensible Markup Language). To accomplish this, the entities on both ends of the message exchange understand, identify, and parse the message format. The message exchanger defines such a mechanism. Data messages are broken down into two portions—one portion (the body) is intended from an ultimate destination and the other portion (the header) is intended for intermediate destination and/or the ultimate destination. The body may be defined so that it must be understood by the ultimate destination. The header may be defined so that it must be understood or changed. Regardless, the data in the body is delivered intact to the ultimate destination. The message exchanger defines a message envelope exchange format in XML over a transport protocol, such as HTTP (HyperText Transport Protocol). This format allows for the execution of RPC (Remote Procedure Call) over XML, but it can be used for any message exchange over a network.

76 Claims, 5 Drawing Sheets

U.S. PATENT DOCUMENTS

| | | | | |
|---|---|---|---|---|
| 4,837,798 | A * | 6/1989 | Cohen et al. | 379/88.14 |
| 5,577,202 | A * | 11/1996 | Padgett | 709/206 |
| 5,742,763 | A * | 4/1998 | Jones | 709/317 |
| 5,838,720 | A * | 11/1998 | Morelli | 375/219 |
| 5,930,479 | A * | 7/1999 | Hall | 709/238 |
| 6,035,327 | A * | 3/2000 | Buckley et al. | 709/206 |
| 6,125,399 | A * | 9/2000 | Hamilton | 709/245 |
| 6,167,448 | A * | 12/2000 | Hemphill et al. | 709/224 |
| 6,185,568 | B1 * | 2/2001 | Douceur et al. | 707/10 |
| 6,268,926 | B1 * | 7/2001 | Okimoto et al. | 358/1.15 |
| 6,389,455 | B1 * | 5/2002 | Fuisz | 709/206 |
| 6,567,857 | B1 * | 5/2003 | Gupta et al. | 709/238 |
| 2002/0010665 | A1 * | 1/2002 | Lefebvre et al. | 705/31 |

OTHER PUBLICATIONS

Postelm Jon; RFC 793: Transmission Control Protocol; Sep. 1981; University of Southern California.*

Crocker, David H.; RFC 822: Standard for the Format of ARPA Internet Text Messages; Aug. 13, 1982; University of Delaware.*

Berners-Lee et al.; RFC 2616: Hypertext Transfer Protocol—HTTP/1.1; Jun. 1999.*

* cited by examiner (expanded details of block 100 in Fig. 3)

METHOD AND SYSTEM FOR EXCHANGING MESSAGES BETWEEN ENTITIES ON A NETWORK COMPRISING AN ACTOR ATTRIBUTE AND A MANDATORY ATTRIBUTE IN THE HEADER DATA STRUCTURE

CROSS-REFERENCE TO RELATED APPLICATIONS

This application claims priority from U.S. Provisional Patent Application Ser. No. 60/148,172 entitled "XML Object Access Protocol" filed on Aug. 10, 1999, and from U.S. Provisional Patent Application Ser. No. 60/193,585 entitled "SOAP: Simple Object Access Protocol" filed on Mar. 30, 2000.

TECHNICAL FIELD

This invention relates to a mechanism for formatting messages and exchanging them between entities in a decentralized, distributed networking environment.

BACKGROUND

HTML (HyperText Markup Language) document encoding has proven to be flexible and useful on the Internet for viewing documents. The World Wide Web ("Web") has grown popular in large part to HTML's graphical representations of data and its links to other data.

HTML is a specific implementation of a SGML (Standard Generalized Markup Language). SGML is a generic text formatting language that is widely used for large databases and multiple media projects. It is particularly well suited for works that involve intensive cross-referencing and indexing. HTML is an application of SGML. It uses tags to mark elements, such as text and graphics, in a document to indicate how Web browsers should display these elements to the user and should respond to user actions. Such an action may be an activation of a link by means of a key press or mouse click.

XML (eXtensible Markup Language) is a specific implementation of a condensed form of SGML. XML lets Web developers and designers create customized tags that offer greater flexibility in organizing and presenting information than is possible with the HTML document encoding system.

In HTML, both the tag semantics and the tag set are fixed. XML specifies neither semantics nor a tag set. In fact, XML is really a meta-language for describing markup languages. In other words, XML provides a facility to define tags and their structural relationships. This facility may be called a "grammar." Since there is no predefined tag set, there is not any preconceived semantics or grammar. The semantics and grammar of an XML document is defined by the applications that process them.

As the Internet is becoming a serious business tool, HTML's limitations are becoming more apparent. For example, HTML can be used to exchange presentation data (such as images and text), but it is not capable of exchanging data messages (such as those containing commands, instructions, requests, or complex business documents) conveniently. In message-oriented programming, a message is the way that one program entity requests an action from another entity. Typically, a message specifies the name of the entity or service to which the request is made, the action (or method) to be performed, and any parameter or value that needs to be specified for this request. Therefore, a "message exchange" is a communication in which an entity sends a message to another entity to request that the other entity take some action and, if appropriate, respond. An entity may be a person, program object, an application, an operating system, a computer, a computer system, a network, and so forth.

Message exchanges between entities are important to a distributed computing environment where computers actively distribute work and data across a network. Such distributed computing environments are common for "private" networks, such as LANs and WANs. These private networks support message exchange protocols (MEP). For example, RPC (Remote Procedure Call) is a common MEP.

Typically, these private networks support message exchanges between entities using the same platform. For example, a group of computers using a variety of the Microsoft® Windows® operating systems on a network may easily exchange messages using their native MEP. Likewise, a group of computers each using the same "unix"-based network may easily exchange message using their native MEP.

However, exchanging messages across heterogeneous platforms is difficult to implement. If possible, such message exchanges typically require translation and conversion between MEPs. Moreover, exchanging messages over a "public" network is more difficult to implement. A "public" network (like the Internet) includes multiple platforms that may or may not allow the exchange of messages using a specific MEP. Additionally, it may be difficult or impossible to predict MEP in advance.

While HTML is valuable for transmitting presentation data (such as images and text) over the Internet for human viewing, it does not have the capability to conveniently exchange data messages between entities (e.g., program modules) over the Internet. Using HTML to transmitting a document from one entity to another is not "message exchange" as understood by those skilled in the art of message-oriented programming. Instead, one entity (such as a Web server) is simply delivering data to be displayed to another entity (such as a Web browser) and this other entity is not acting upon such data. The Web server cannot request that the browser perform some task based upon the delivered data. The Web server has no control over what the browser does with the delivered data.

Sometimes the delivered data includes a small program ("applet") using a programming language such as Java. This is not "message exchange" as understood by those skilled in the art of message-oriented programming. The Web server simply delivers the applet, but it cannot cause it be run on the browser. Note that delivery of the applet is not a request for the browser to perform a specific function.

HTML is a format used for exchanging presentation data meant for human consumption. The web-server sends HTML to the web-browser that renders it for human consumption. In other words, HTML tags are the commands and hints to the web-browser on how to render the presentation data.

HTML and similar protocols are not primarily targeted as a mechanism for program-to-program communication that may not involve any human interaction at all. Communicating programs/entities typically agree on the commands and the associated data. A Java applet involves code download and local execution. It is not designed for program-to-program communication.

XML provides flexibility extensibility and specificity that HTML and other protocols do not. Thus, it is possible to use XML to exchange data messages over a public or private network. However, no defined protocol for exchanging messages using XML presently exists.

SUMMARY

Using a message exchanger, data messages are exchanged between entities in a decentralized, distributed, potentially heterogeneous, network environment. The message exchanger employs XML (extensible Markup Language). To accomplish this, the entities on both ends of the message exchange understand, identify, and parse the message format.

The message exchanger defines such a mechanism. Data messages are broken down into two portions—one portion (the body) is intended from an ultimate destination and the other portion (the header) is intended for intermediate destination and/or the ultimate destination. The body may be defined so that it must be understood by the ultimate destination. The header may be defined so that it must be understood or changed. Regardless, the data in the body is delivered intact to the ultimate destination.

The message exchanger defines a message envelope exchange format in XML over a transport protocol, such as HTTP (HyperText Transport Protocol). This format allows for the execution of RPC (Remote Procedure Call) over XML, but it can be used for any message exchange over a network. The basic format (i.e., grammar) of the message envelope is:

<Envelope>
  <Header>
  header data (such as security and routing information or any other data)
  </Header>
  <Body>
  body data (such as a data structure or a request to perform some action or some other "method invocation")
  </Body>
</Envelope>

To send this message over HTTP on the Internet, special HTTP bindings are employed. However, this format can be used with other transport protocols.

Also, there is a mechanism for returning error code return from the receiver if the receiver is unable to satisfy the request. The format is the same as above except body contents are specified to include a fault information structures.

DETAILED DESCRIPTION

The following description sets forth a specific embodiment of the message exchanger that incorporates elements recited in the appended claims. This embodiment is described with specificity in order to meet statutory written description, enablement, and best-mode requirements. However, the description itself is not intended to limit the scope of this patent. Rather, the inventors have contemplated that the claimed message exchanger might also be embodied in other ways, in conjunction with other present or future technologies.

INCORPORATION BY REFERENCE

This application claims priority from U.S. Provisional Patent Application Ser. No. 60/148,172 entitled "XML Object Access Protocol" filed on Aug. 10, 1999, and from U.S. Provisional Patent Application Ser. No. 60/193,585 entitled "SOAP: Simple Object Access Protocol" filed on Mar. 30, 2000.

Introduction

The exemplary message exchanger (herein embodiments of such message exchanger may be called: "message formatter," "message sender," "message parser," "message receiver," or the like) are implemented by one or more computer entities on a communications network. The exemplary message exchanger provides a simple and lightweight mechanism for exchanging messages between entities in a decentralized, distributed network environment. The exemplary message exchanger exchanges messages using Simple Object Access Protocol (SOAP) that utilizes eXtensible Markup Language (XML) for data formatting.

The exemplary message exchanger does not itself define any application semantics or grammar such as a programming model or implementation-specific semantics; rather it defines a simple mechanism for expressing application semantics by providing a modular messaging packaging model. This allows the exemplary message exchanger to be used in a large variety of systems ranging from general messaging systems to message-oriented programming systems to Remote Procedure Calls (RPC).

The exemplary message exchanger envelope construction defines an overall framework (i.e., grammar and semantics) for expressing what is in a message; who should deal with which parts, and whether parts are optional or mandatory.

Figure 1:
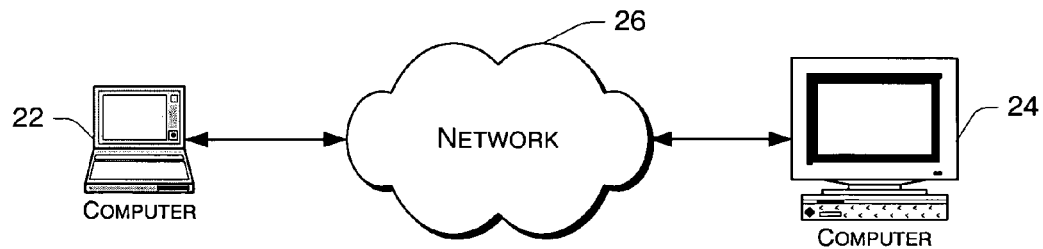
FIG. 1 is a schematic illustration of an exemplary computer network (such as the Internet) that includes two computer entities.

FIG. 1 shows two computers 22, 24. These computers are connected to each other via a computer network 26. These computers may be desktop, laptop, handheld, server, or mainframe computers. These computers may be capable of connecting to a communications network and exchanging messages. The network 26 may be a private network or a public network (e.g., the Internet).

Herein, an entity is understood to be a computer component that is capable of exchanging messages in an message-oriented, decentralized, distributed network environment. For example, an entity may be a computer, a computer system, a component of a computer, or an application running on a computer.

Using the message exchanger, messages may be exchanged between entities (such as applications running on computers 22 and 24) in a decentralized, distributed network environment. The exemplary message exchanger employs XML (eXtensible Markup Language).

The exemplary message exchanger defines such a mechanism for the entities at both ends of the message exchange to understand, identify, and parse the message format. In this exemplary embodiment, it specifically defines a message envelope exchange format in XML and a transport binding over HTTP. However, other protocols may be used, such as TCP/IP, UDP, SMTP, POP3, and the like. This format allows for the execution of RPC (Remote Procedure Call) over XML, but it can be used for any message exchange over a network.

Herein, an entity generating and sending a message is an "originating" entity (i.e., originator). An entity that is the ultimate destination of a message is a "destination" entity (i.e., ultimate destination). An entity sending a message is a "sending" entity (i.e., sender). An entity receiving a message is a "receiving" entity (i.e., recipient). An entity receiving a message, but is not the ultimate destination, is an "intermediate" entity (i.e., intermediary). Furthermore, a message intended for a subsequent destination entity may be received by an intermediate entity wherein such message may indicate that the intermediate entity should take some action. Such an intermediate entity may be referred to as the "actor" entity.

Message Envelope Format

Figure 2:
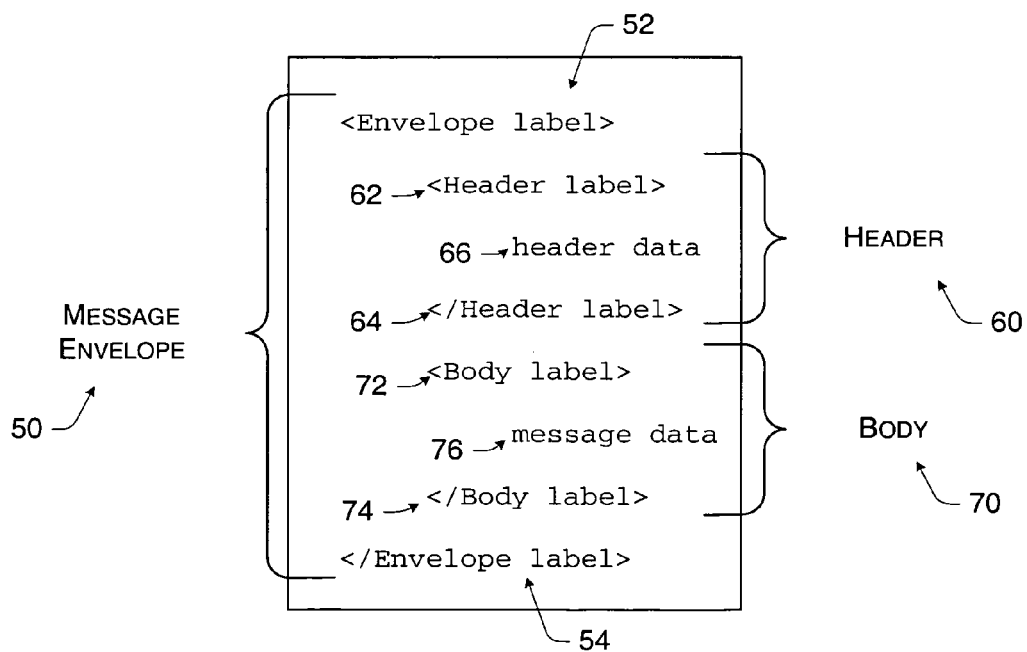
FIG. 2 is a textual illustration of a message format implemented using the exemplary messaging exchanger.

Using the exemplary message exchanger, the message is an XML document that consists of a message envelope, a header, and a body. This exemplary XML document is simply called the "message" for the rest of this document. FIG. 2 shows the basic format of a message. The message contains the following:

As shown in FIG. 2, a message envelope 50 is the top hierarchical element of the message.

Inside the envelope 50 is a header 60. The header is a mechanism for adding features to the message in a decentralized manner with or without prior agreement between the communicating entities. The message may include attributes that indicate who (which entity) should deal with a feature and whether it is optional or mandatory.

Also, inside the envelope 50 is a body 70. The body is a container for commands and data intended for the ultimate recipient of the message (the destination entity).

ENVELOPE: The envelope is the package containing the message itself. In FIG. 2, the overall envelope is shown at 50. A beginning tag 52 and an ending tag 54 define the boundary of the envelope. The title "Envelope label" used in the tags is a label used to indicate and identify that it is a message envelope. The actual label used may be anything that means something to the specific implementation of the message exchanger. For example, the label may be "Envelope", "Message", "Package", "Command", and "MSG".

The beginning tag 52 may also include a reference to another entity that defines the format of the message for the receiving entity. Alternatively, it may include a reference to one of a set of existing format definitions. These format-defining references may be called the schema definitions.

For more information on schemas, refer to World Wide Web Consortium's (W3C's) document "XML Schema Part 0: Primer" at http://www.w3.org/TR/TR/xmlschema-0. For more information on namespaces, refer to the W3C's document "Namespaces in XML" at http://www.w3.org/TR/I 1999/REC-xml-names-19990114.

The tags themselves are encoded by using an XML tag convention of angle brackets ("<" and ">") to designate the boundaries of a tag enclosing the label of the tag and various optional attributes. The ending tag is identified using another XML tag convention of a forward slash ("/") immediately after the open angle bracket ("<") and before the label. Herein, these conventions are collectively known as the "XML tag convention." More details of such a convention may be found in the W3C XML 1.0 specification.

HEADER: As shown in FIG. 2, the header 60 is positioned immediately after the envelope's beginning tag 52. A beginning header tag 62 and an ending header tag 64 define the boundary of the header. These tags use the XML tag convention and the "header label" is used to indicate and identify that it is a header in the envelope. The actual label used may be anything that means something to the specific implementation of the message exchanger. For example, the label may be "Header", "Pre-body", "Preamble", "Intro", or "Prelim."

The header provides a flexible mechanism for extending a message in a decentralized and modular way without prior knowledge between the communicating parties. Typical examples of extensions that can be implemented within header data 66 are authentication, transaction management, payment, etc. In FIG. 2, the header data 66 is located between the header tags 62, 64.

All immediate child elements of the header data are called header entries (i.e., element) and each header entry is encoded as an independent element within the header data.

Generally, the header data 66 affects how a receiving entity processes the message. The data that affects how a receiving entity processes the message may be called "header data."

To enable distributed extension, the header data entries in header data 66 may include a "mandatory" attribute and/or an "actor" attribute. The mandatory attribute indicates whether a header entry (i.e., header element) in the header data is mandatory or optional for a recipient to process. The mandatory attribute may also be called a "mustUnderstand" attribute. The actor attribute specifies the identity of the entity that is intended to process an associated header entry.

BODY: As shown in FIG. 2, the body 70 is positioned immediately after the header's ending tag 64. A beginning body tag 72 and an ending body tag 74 define the boundary of the body. These tags use the XML tag convention and the "body label" is used to indicate and identify that it is the body in the envelope. The actual label used may be anything that means something to the specific implementation of the message exchanger. For example, the label may be "Body", "Payload", "Contents", "Cargo", and "Data".

Body data 76 is located between the body tags 72, 74. Herein, the body data may also be called "message data". The body data may contain a command with parameters and data. It may contain a data structure. It may contain any data that may be exchanged between entities in a message-oriented decentralized, distributed network environment.

All immediate child elements of the body data are called body entries (i.e., element) and each body entry is encoded as an independent element within the body data.

The body data 76 provides a simple mechanism for exchanging information intended for the destination entity. Typical uses of the body data include sending business documents, messages, event notifications, marshalling RPC calls, and error reporting.

Using the Exemplary Message Exchanger for RPC

One of the applications of the exemplary message exchanger is to encapsulate and exchange RPC calls using the extensibility and flexibility of XML. In the case of using HTTP as the protocol binding, an RPC call maps naturally to an HTTP request and a RPC response maps to an HTTP response. However, using the exemplary message exchanger for RPC is not limited to the HTTP protocol binding.

To make a RPC method call (i.e., "method invocation") using the exemplary message exchanger, the following information is typically provided within a message:

The URI of the target object (i.e., name of and reference to the destination entity)
  A method name (i.e., task to be performed)
  The parameters to the method
  Optional header data The information for the RPC method calls and responses are placed within the body of the message. Such calls and responses are encoded into the body data as follows:

The method name is the first immediate child element of the body data.
  Method parameters ([in] and [in/out] for a request, [in/out] and [out] for a response) are each encoded as child elements of the method name element using the following rules:
    The name of the parameter in the method signature is used as the name of the corresponding element.
    Parameter values are expressed using specific rules.

RPC and Header

An example of a use of the header element is the passing of a transaction ID along with a message. Since the transaction ID is not part of the method signature and is typically held in an infrastructure component rather than in the application code, there typically is no direct way to pass the necessary information with the call. By adding an entry to the headers and giving it a fixed name, the transaction manager on the receiving entity can extract the transaction ID and use it without affecting the coding of remote procedure calls.

Exemplary Methodological Implementation of the Message Exchanger

Figure 3:
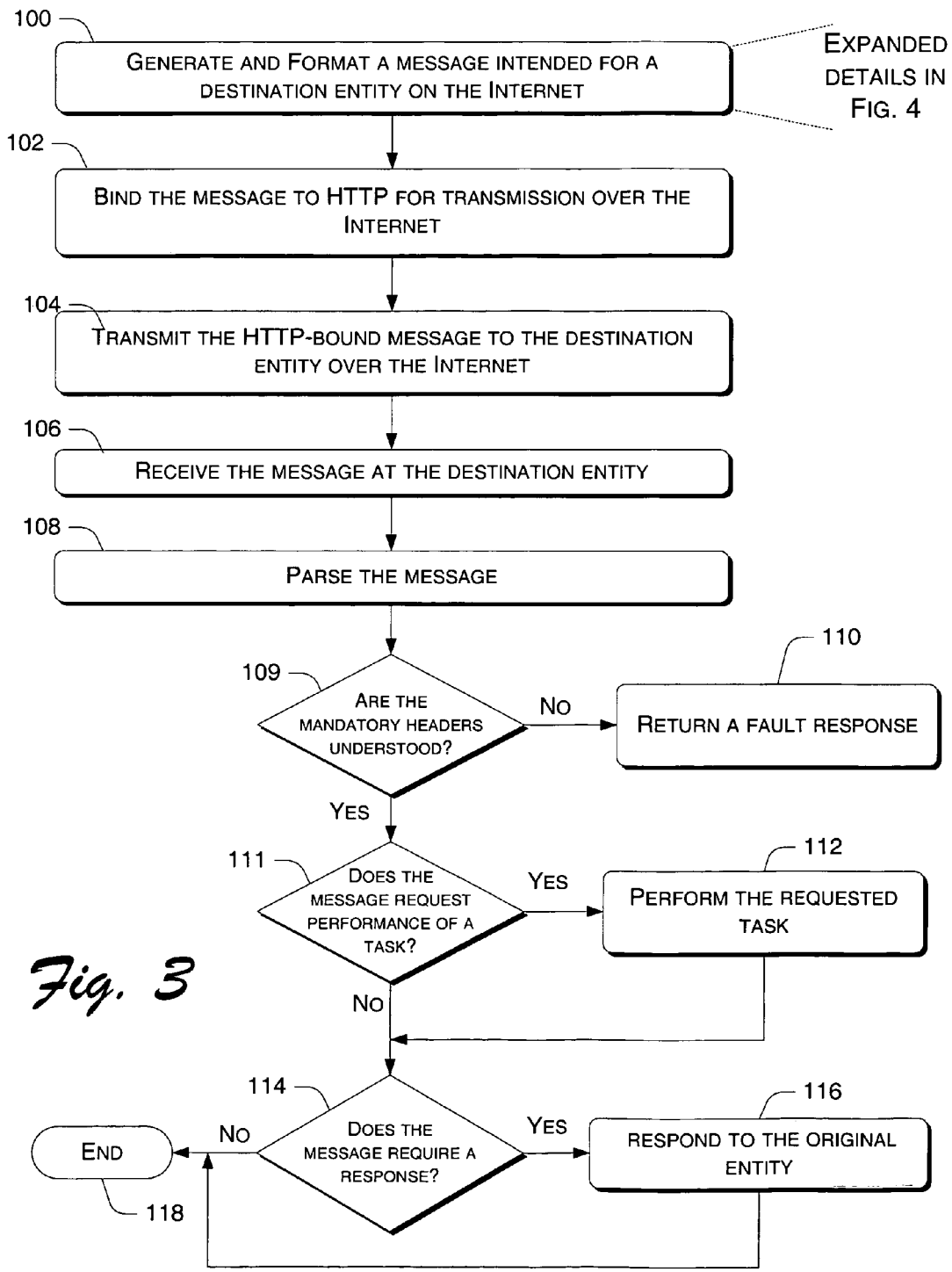
FIG. 3 is flowchart showing a process implementing the exemplary messaging exchanger.
Figure 4:
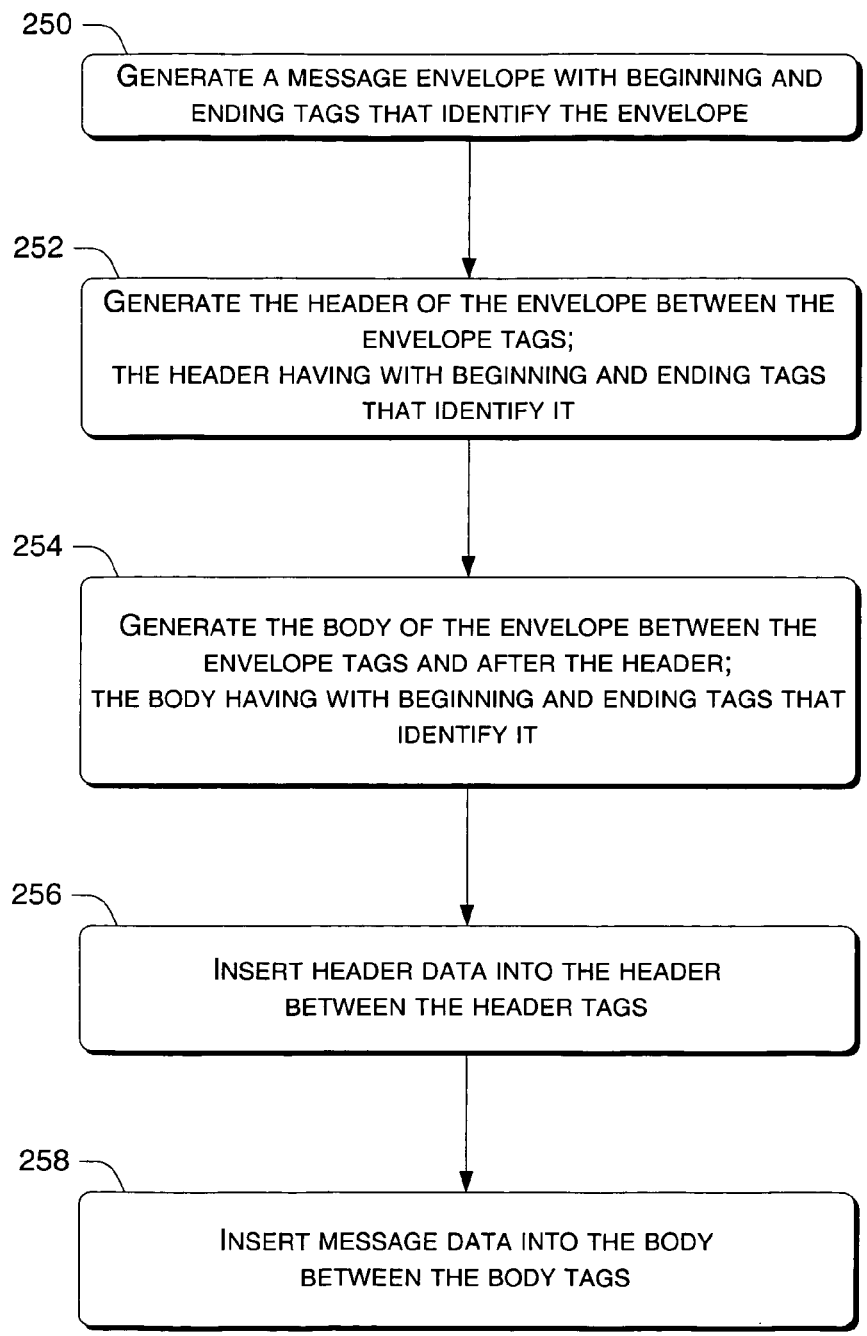
FIG. 4 is flowchart showing another process implementing the exemplary messaging exchanger.

FIGS. 3 and 4 show an exemplary methodological implementation of the message exchanger. An originating entity (such as an application within computer 22 in FIG. 1) has a need to send a message across a message-oriented, decentralized, distributed network environment to a destination entity (such as an application within computer 24 in FIG. 1). That message may be a request for the destination entity to store data, a request for the destination entity to perform a task, a query regarding information to which the destination entity has access, or a data structure.

At 100 in FIG. 3, the originating entity generates message intended for the destination entity. In so doing, the originating entity formats the message in accordance with the format shown in FIG. 2. The details of block 100 are shown in FIG. 4 and discussed next.

At 250 of FIG. 4, the originating entity generates a message envelope with beginning and ending tags that identify the message envelope. This envelope and its tags are formatted like envelope 50 and tags 52, 54 in FIG. 2.

At 252 of FIG. 4, the originating entity generates a header with beginning and ending tags that identify the header. The header is placed between the envelope tags and immediately after the beginning envelope tag. This header and its tags are formatted like header 60 and tags 62, 64 in FIG. 2.

At 254 of FIG. 4, the originating entity generates a body with beginning and ending tags that identify the body. The body is placed between the envelope tags and immediately after the ending header tag. This body and its tags are formatted like body 70 and tags 72, 74 in FIG. 2.

At 256 of FIG. 4, the originating entity inserts the header data into the header between the header tags. At 258 of FIG. 4, the originating entity inserts the body data into the body between the body tags. Of course, the order that blocks 250–258 are processed is not important so much as their relative positioning (i.e., format) within the resulting message.

Returning to the discussion of the main messaging process shown in FIG. 3, the message is bound to a protocol at 102. Specifically, the originating entity binds the message to HTTP for transmission over the Internet. At 104, the originating entity transmits the HTTP-bound message to the destination entity over the Internet. This message will, most likely, travel through several intermediate entities. The intermediate entities may or may not examine at the contents of the message. Although an intermediate entity may not be the destination entity, it may be a receiving entity since it receives the message.

At 106, the destination entity receives the message. At 108, the destination entity parses the message. To accomplish this, the destination entity knows the designated format of the message a priori. In other words, destination entity parses the message assuming that it is in a specific format (in particular, in the format shown in FIG. 2). Alternatively, there may be information in the envelope tags that indicates the format of the message. This information may be the name of a format or a reference to storage location on the network that contains the format definition.

At 109, the destination entity determines whether the header has a mandatory attribute and if so, whether it is understood. If the mandatory header is not understood, then it returns a fault response at 110. Otherwise, the process continues to block 111.

At 111, the destination entity determines if the message requests the entity to perform a task. If so, the entity performs the requested task at 112.

After blocks 111 and 112, the destination entity determines if the message requires a response at 114. If it does, then the destination entity responds accordingly at 116. To respond, the destination entity generates and formats a new message containing the appropriate response. Thus, for the response the destination entity becomes the originating entity and vise versa. The above-describe process is performed to send a response from the original destination entity to the original originating entity.

The process ends at 118.

Mandatory Attribute

A mandatory attribute indicates whether a header entry in the header data is mandatory or optional for the recipient to process. The mandatory attribute is also called a "mustUnderstand" attribute. The recipient of a header entry is typically specified by an actor attribute (which is discussed below).

In the exemplary implementation, the mandatory attribute has the following label "mustUnderstand". This attribute is either "1" meaning "yes" or "0" meaning "no". The absence of the mandatory attribute is semantically equivalent to its presence with the value "0".

If a header element is tagged with a mandatory attribute with a value of "1", the recipient of that header entry either obeys the semantics (as conveyed by its element name, contextual setting, and so on) and takes the action indicated by the semantics, or it fails processing the message.

In the exemplary message exchanger, use of a mandatory attribute allows for robust evolution. Elements tagged with the mandatory attribute with a value of "1" are presumed to somehow modify the semantics of their parent or peer elements. Tagging elements in this manner assures that this change in semantics will not be silently (and, presumably, erroneously) ignored by those entities that may not fully understand it.

Below is an example of a header with a label of "Transaction", a mandatory attribute called "mustUnderstand" turned on (by setting it to "1") and a value of 5:

```
<SOAP-ENV Header>
    <t:Transaction
        xmlns:t="some-URI" SOAP-ENV:mustUnderstand="1">
    5
    </t:Transaction>
</SOAP-ENV:Header>
```

In addition, the mandatory attribute may also be inserted into the body data to further identify the destination entity.

The entity that examines and processes the mandatory attribute is determined by the actor attribute, discussed below.

Actor Attribute

The message travels from the originator to the ultimate destination potentially by passing through a set of intermediaries along the message path. An intermediary is an entity that is capable of both receiving and forwarding the messages, but it is not the intended destination. Both intermediaries as well as the ultimate destination may be identified by a URI (Universal Resource Identifier).

The actor attribute specifies and identifies the intended recipient of a header element. Omission of the actor attribute indicates that the sender is unconcerned about which entity should process the header element. The actor attribute is used to identify the entity that is going to act on that header element.

Not all parts of the message may be intended for the ultimate destination of the message but may be intended for one or more of the intermediaries on the message path. Specifically, a header element (directed to the recipient) may be intended for an intermediary. The role of a recipient of a header element (directed to the recipient) is similar to that of accepting a contract in that it cannot be extended beyond the recipient. That is, a recipient receiving a header element does not forward that header element to the next application in the message path. The recipient may insert a similar header element but in that case, the contract is between that intermediary and the recipient of that header element.

Alternative Methodological Implementation of the Exemplary Message Exchanger

In an alternative exemplary methodological implementation of the message exchanger, an entity receiving a message does not know whom the message is intended for. Although the message is not intended for the receiving entity, a portion in the header may be intended for it. The actor attribute in the header may identify the receiving entity as the intended recipient for a specific portion of the header. Therefore, a receiving entity examines the header of a message to determine how to handle the message. More specifically, the receiving entity may be an "actor" entity that acts on part of the header.

Figure 5:
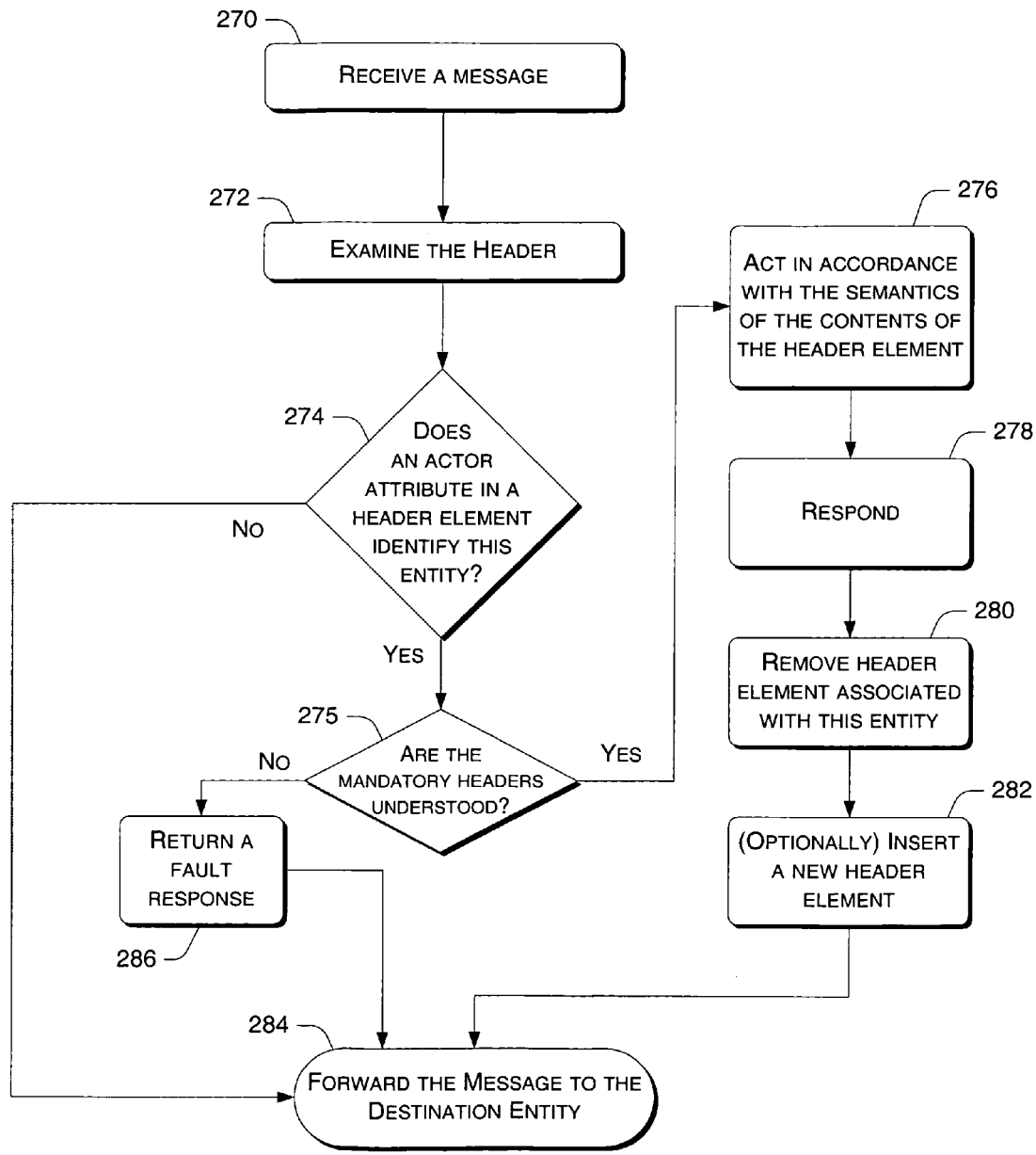
FIG. 5 is flowchart showing process implementing an alternative messaging exchanger.

At 270 in FIG. 5, an entity receives a message formatted in accordance with the message format shown in FIG. 2. This entity is any intermediate entity. At 272, the intermediate entity examines the header. At 274, the entity determines if one of the elements in the header data has an actor attribute directed towards the entity itself. If not, then the message is forwarded to the destination entity at 284.

If so, then, at 275, the intermediate entity (now called the "actor" entity) determines if there is a mandatory attribute that it must understand. If there is such an attribute and it does not understand it, then it returns a fault response at 286 and forwards the message to the destination entity at 284.

If the heading includes a mandatory attribute and the actor entity understands it, the actor entity acts in accordance with the semantics of the contents of the header element. In other words, the contents of the header element either directs the entity to perform some task and/or provides data for the entity to performs some presumed task. That task might be to respond. If so, then the entity responds at 278. At 280 and 282, the actor entity removes the header directed at it and (optionally) replaces the header with a new one. After that, the message is forwarded to the destination entity at 284.

In general, headers typically capture out-of-band data over which the communicating entities have no prior agreement. There are two kinds of header entries.

End-to-end header entries such as those that capture transaction and security contexts of the sender.

Hop-to-hop header entries such as those that capture routing information.

A header entry is either successfully understood and processed by an entity or it is not. In the later case, it is an error only if the header entry has the "mandatory" attribute set to "1", in which case a "mustUnderstand" fault-response is sent to the originating entity.

In the exemplary message exchanger, processing a header entry does not typically involve generating other kinds of response to the originating entity, but it may. But it may in alternative implementations. In addition, in the exemplary message exchanger, successful processing a header entry does not necessarily result in its removal and similarly, removal of a header entry does not necessarily result in addition of a new entry. But it may in alternative implementations.

Fault Message

If an intermediate entity for which it is the actor (i.e., an "actor" entity) does not understand a mandatory element of a message or if a receiving entity encounters a problem in processing the message (or its requested task), then the receiving entity sends a response message that includes an error indication. This is called a "fault message."

The fault message is generated, formatted, and sent in the same manner described above for any message. In this case, the message is sent in response to another message and the body of the message includes an error indication (i.e., "fault element").

A fault element typically has four subelements:
faultcode
faultstring
faultactor
detail The faultcode subelement is intended for use by an entity to provide an algorithmic mechanism for identifying the fault. The exemplary message exchanger defines a small set of the fault codes covering basic the message exchange faults.

The faultstring subelement is intended to provide a human readable explanation of the fault and is not intended for algorithmic processing. The faultstring element is similar to the 'Reason-Phrase' defined by HTTP.

The faultactor subelement is intended to provide information about which receiving entity caused the fault to happen within the message path. It is similar to the actor attribute but instead of indicating the destination of a header entry, it indicates the source of the fault. The value of the faultactor attribute is a URI identifying the source.

The detail subelement is intended for carrying application specific error information related to the body element. The absence of the detail subelement in the fault element indicates that the fault is not related to processing of the body data. This can be used to distinguish whether the body data was processed or not in case of a fault situation.

Using the Exemplary Message Exchanger in HTTP

Binding a message to HTTP provides the advantage of being able to use the formalism and decentralized flexibility of the exemplary message exchanger with the rich feature set of HTTP. Carrying the message in HTTP does not mean that the message overrides existing semantics of HTTP but rather that the semantics of the message sent over HTTP maps naturally to HTTP semantics.

The exemplary message exchanger naturally follows the HTTP request/response message model providing the message request parameters in a HTTP request and the message response parameters in a HTTP response.

HTTP applications use the media type "text/xml" when including a message envelope in a HTTP message.

HTTP Request: Although any of HTTP request methods may be used, this exemplary implementation sends HTPP-bound messages within an HTTP POST requests.

Action HTTP Header Field: An action HTTP header field may be used to indicate the intent of an HTTP-bound message in an HTTP request. The presence and content of the action header field may be used by servers (such as firewalls) to appropriately filter an HTTP-bound message in an HTTP request.

HTTP Response: An HTTP-bound message follows the semantics of the HTTP status codes for communicating status information in HTTP. For example, a 2xx status code indicates that the client's request including the message component was successfully received, understood, and accepted etc.

In case of an error while processing the request, the HTTP server issues an HTTP 500 "Internal Server Error" response and include a message in the response containing a fault element indicating the processing error.

HTTP Extension Framework: A message may be used together with the HTTP Extension Framework in order to identify the presence and intent of a HTTP-bound message in an HTTP request.

A specific implementation may use either the Extension Framework or plain HTTP. Clients can force the use of the HTTP Extension Framework by using a mandatory extension declaration and the "M-" HTTP method name prefix. Servers can force the use of the HTTP Extension Framework by using the 510 "Not Extended" HTTP status code. That is, using one extra round trip, either party can detect the policy of the other party and act accordingly.

EXAMPLES OF THE MESSAGES EXCHANGED USING THE EXEMPLARY MESSAGE EXCHANGER

In the following examples, a GetLastTradePrice request is sent to a StockQuote service. The request takes a string parameter, ticker, and returns a float in a response.

Example 1

```
POST /StockQuote HTTP/1.1
Host: www.stockquoteserver.com
Content-Type: text/xml
Content-Length: nnnn
SOAP Action: "Some-URI"
<SOAP-ENV:Envelope
    xmlns:SOAP-ENV="http://schemas.xmlsoap.org/soap/envelope/"
    SOAP-ENV:encodingStyle=
    "http://schemas.xmlsoap.org/soap/encoding/"/>
        <SOAP-ENV:Header>
            <t:Transaction
                xmlns:t="some-URI"
                SOAP-ENV:mustUnderstand="1">
                5
            </t:Transaction>
        </SOAP-ENV:Header>
        <SOAP-ENV:Body>
            <m:GetLastTradePrice xmlns:m="Some-URI">
                <symbol>DEF</symbol>
            </m:GetLastTradePrice>
        </SOAP-ENV:Body>
</SOAP-ENV:Envelope>
```

Example 2

```
HTTP/1.1 200 OK
Content-Type:text/xml
Content-Length:nnnn
<SOAP-ENV:Envelope
    xmlns:SOAP-ENV="http://schemas.xmlsoap.org/soap/envelope/"
    SOAP-ENV:encodingStyle=
    "http://schemas.xmlsoap.org/soap/encoding/"/>
        <SOAP-ENV:Header>
            <t:Transaction
                xmlns:t="some-URI"
                xsi:type="int" mustUnderstand="1">
                5
            </t:Transaction>
        </SOAP-ENV:Header>
        <SOAP-ENV:Body>
            <m:GetLastTradePriceResponse
                xmlns:m="Some-URI">
                <Price>34.5</Price>
            </m:GetLastTradePriceResponse>
        </SOAP-ENV:Body>
</SOAP-ENV:Envelope>
```

Example 3

```
HTTP/1.1 500 Internal Server Error
Content-Type: text/xml
Content-Length: nnnn
<SOAP-ENV:Envelope
    xmlns:SOAP-ENV=
    http://schemas.xmlsoap.org/soap/envelope/">
        <SOAP-ENV:Body>
            <SOAP-ENV:Fault>
                <faultcode>MustUnderstand</faultcode>
                <faultstring>the exemplary message exchanger Must Understand Error</fault string>
            </SOAP-ENV:Fault>
        </SOAP-ENV:Body>
</SOAP-ENV:Envelope>
```

Example 4

```
HTTP/1.1 500 Internal Server Error
Content-Type: text/xml
Content-Length: nnnn
<SOAP-ENV:Envelope
    xmlns:SOAP-ENV="http://schemas.xmlsoap.org/soap/envelope/">
        <SOAP-ENV:Body>
            <SOAP-ENV:Fault>
                <faultcode>Server</faultcode>
                <faultstring>Server Error</faultstring>
                <detail>
                    <e:myfaultdetails xmlns:e="Some-URI">
                        <message>
                            My application didn't work
                        </message>
                        <errorcode>
                            1001
                        </errorcode>
                    </e:myfaultdetails>
                </detail>
            </SOAP-ENV:Fault>
        </SOAP-ENV:Body>
</SOAP-ENV:Envelope>
```

Exemplary Computing Environment

Figure 6:
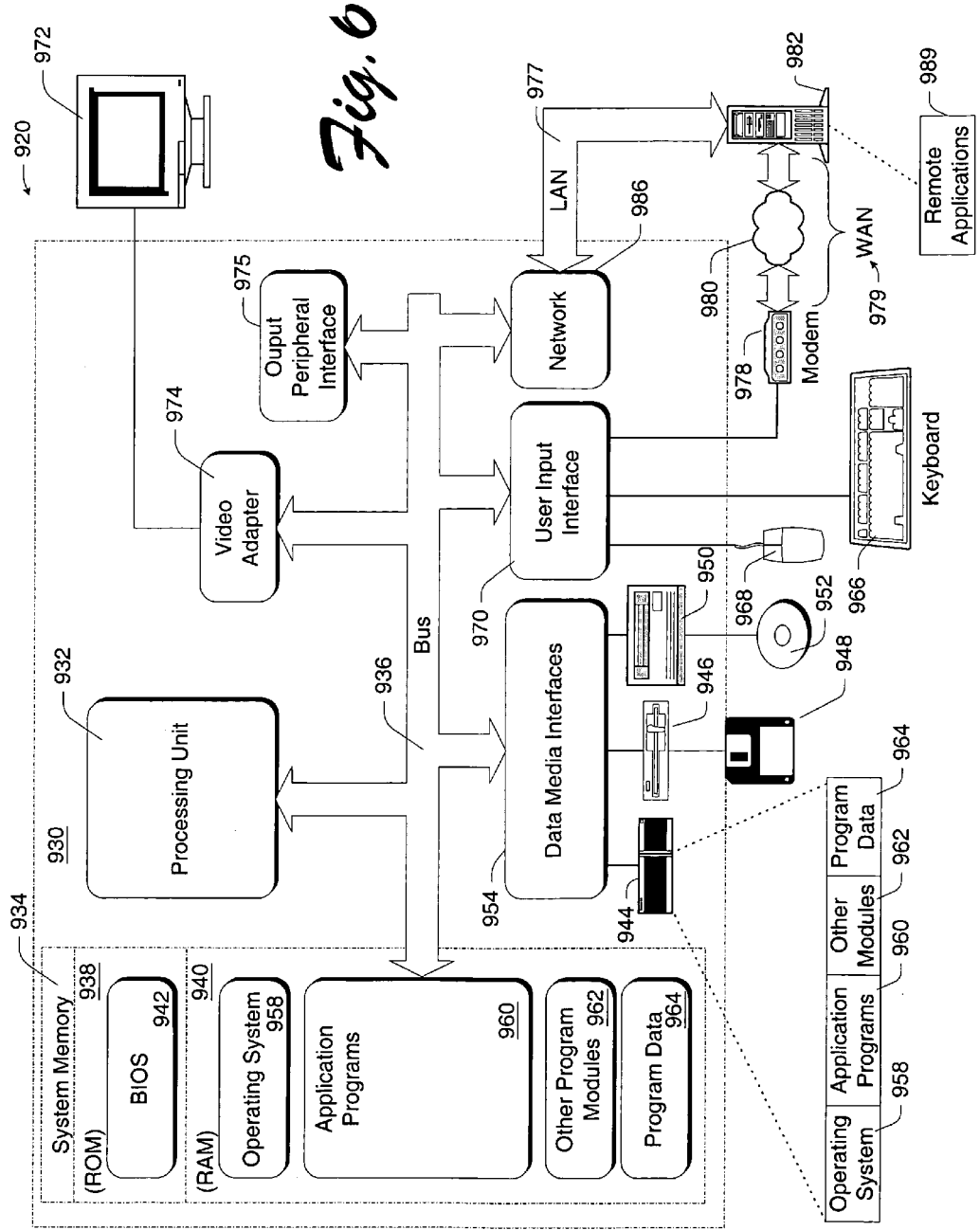
FIG. 6 is an example of a computer capable of implementing the exemplary messaging exchanger.

FIG. 6 illustrates an example of a suitable computing environment 920 on which the exemplary watermarking may be implemented.

Exemplary computing environment 920 is only one example of a suitable computing environment and is not intended to suggest any limitation as to the scope of use or functionality of the exemplary message exchanger. Neither should the computing environment 920 be interpreted as having any dependency or requirement relating to any one or combination of components illustrated in the exemplary computing environment 920.

The exemplary message exchanger is operational with numerous other general purpose or special purpose computing system environments or configurations. Examples of well known computing systems, environments, and/or configurations that may be suitable for use with the exemplary message exchanger include, but are not limited to, personal computers, server computers, think clients, thick clients, hand-held or laptop devices, multiprocessor systems, microprocessor-based systems, set top boxes, programmable consumer electronics, wireless phones, wireless communications equipment, network PCs, minicomputers, mainframe computers, distributed computing environments that include any of the above systems or devices, and the like.

The exemplary message exchanger may be described in the general context of computer-executable instructions, such as program modules, being executed by a computer. Generally, program modules include routines, programs, objects, components, data structures, etc. that perform particular tasks or implement particular abstract data types. The exemplary message exchanger may also be practiced in distributed computing environments where tasks are performed by remote processing devices that are linked through a communications network. In a distributed computing environment, program modules may be located in both local and remote computer storage media including memory storage devices.

As shown in FIG. 6, the computing environment 920 includes a general-purpose computing device in the form of a computer 930. The components of computer 920 may include, by are not limited to, one or more processors or processing units 932, a system memory 934, and a bus 936 that couples various system components including the system memory 934 to the processor 932.

Bus 936 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 930 typically includes a variety of computer readable media. Such media may be any available media that is accessible by computer 930, and it includes both volatile and non-volatile media, removable and non-removable media.

In FIG. 6, the system memory includes computer readable media in the form of volatile memory, such as random access memory (RAM) 940, and/or non-volatile memory, such as read only memory (ROM) 938. A basic input/output system (BIOS) 942, containing the basic routines that help to transfer information between elements within computer 930, such as during start-up, is stored in ROM 938. RAM 940 typically contains data and/or program modules that are immediately accessible to and/or presently be operated on by processor 932.

Computer 930 may further include other removable/non-removable, volatile/non-volatile computer storage media. By way of example only, FIG. 6 illustrates a hard disk drive 944 for reading from and writing to a non-removable, non-volatile magnetic media (not shown and typically called a "hard drive"), a magnetic disk drive 946 for reading from and writing to a removable, non-volatile magnetic disk 948 (e.g., a "floppy disk"), and an optical disk drive 950 for reading from or writing to a removable, non-volatile optical disk 952 such as a CD-ROM, DVD-ROM or other optical media. The hard disk drive 944, magnetic disk drive 946, and optical disk drive 950 are each connected to bus 936 by one or more interfaces 954.

The drives and their associated computer-readable media provide nonvolatile storage of computer readable instructions, data structures, program modules, and other data for computer 930. Although the exemplary environment described herein employs a hard disk, a removable magnetic disk 948 and a removable optical disk 952, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 948, optical disk 952, ROM 938, or RAM 940, including, by way of example, and not limitation, an operating system 958, one or more application programs 960, other program modules 962, and program data 964.

A user may enter commands and information into computer 930 through input devices such as keyboard 966 and pointing device 968 (such as a "mouse"). Other input devices (not shown) may include a microphone, joystick, game pad, satellite dish, serial port, scanner, or the like. These and other input devices are connected to the processing unit 932 through an user input interface 970 that is coupled to bus 936, but may be connected by other interface and bus structures, such as a parallel port, game port, or a universal serial bus (USB).

A monitor 972 or other type of display device is also connected to bus 936 via an interface, such as a video adapter 974. In addition to the monitor, personal computers typically include other peripheral output devices (not shown), such as speakers and printers, which may be connected through output peripheral interface 975.

Computer 930 may operate in a networked environment using logical connections to one or more remote computers, such as a remote computer 982. Remote computer 982 may include many or all of the elements and features described herein relative to computer 930.

Logical connections shown in FIG. 6 are a local area network (LAN) 977 and a general wide area network (WAN) 979. Such networking environments are commonplace in offices, enterprise-wide computer networks, intranets, and the Internet.

When used in a LAN networking environment, the computer 930 is connected to LAN 977 network interface or adapter 986. When used in a WAN networking environment, the computer typically includes a modem 978 or other means for establishing communications over the WAN 979. The modem 978, which may be internal or external, may be connected to the system bus 936 via the user input interface 970, or other appropriate mechanism.

Depicted in FIG. 6, is a specific implementation of a WAN via the Internet. Over the Internet, computer 930 typically includes a modem 978 or other means for establishing communications over the Internet 980. Modem 978, which may be internal or external, is connected to bus 936 via interface 970.

In a networked environment, program modules depicted relative to the personal computer 930, or portions thereof, may be stored in a remote memory storage device. By way of example, and not limitation, FIG. 6 illustrates remote application programs 989 as residing on a memory device of remote computer 982. It will be appreciated that the network connections shown and described are exemplary and other means of establishing a communications link between the computers may be used.

Exemplary Operating Environment

FIG. 6 illustrates an example of a suitable operating environment 920 in which the exemplary message exchanger may be implemented. Specifically, the exemplary message exchanger is implemented by any program 960–962 or operating system 958 in FIG. 6.

The operating environment is only an example of a suitable operating environment and is not intended to suggest any limitation as to the scope of use of functionality of the exemplary message exchanger described herein. Other well known computing systems, environments, and/or configurations that may be suitable for use with the exemplary message exchanger include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Computer-Executable Instructions

An implementation of the exemplary message exchanger may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of the exemplary message exchanger may be stored on or transmitted across some form of computer readable media. Computer readable media can be any available media that can be accessed by a computer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal such as carrier wave or other transport mechanism and included any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the message exchanger has been described in language specific to structural features and/or methodological steps, it is to be understood that the message exchanger defined in the appended claims is not necessarily limited to the specific features or steps described. Rather, the specific features and steps are disclosed as preferred forms of implementing the claimed message exchanger.

The invention claimed is:

1. A method of formatting a message for exchange between entities on a network, the method comprising:
   generating a message envelope;
   generating contents of the message envelope, the contents comprising data structures, each data structure identifies which entity is intended to process the data structure when that entity receives the message envelope over the network, wherein at least one of the data structures includes an actor attribute specifying the identity of that entity and a mandatory attribute indicating that an explicit request for that entity to perform a task in the data structure must be understood and processed by that entity.

2. A method as recited in claim 1, wherein each data structure specifies whether the entity that is intended to process the data structure must understand such data structure.

3. A method as recited in claim 1, wherein:
the message envelope has beginning and ending envelope tags;
the contents of the message envelope is between the envelope tags.

4. A method as recited in claim 1, wherein the contents include:
a header data structure;
a body data structure, the body data structure including message data.

5. A method as recited in claim 4, wherein:
the header data structure has beginning and ending header tags;
the body data structure has beginning and ending body tags.

6. A method as recited in claim 4, wherein:
the header data structure is intended for at least one intermediate entity;
the body data structure is intended for a destination entity.

7. A method as recited in claim 1 further comprising sending the message envelope to an entity on a network.

8. A method as recited in claim 1, wherein the data structures lack executable instructions for performing the task.

9. A method as recited in claim 1, wherein the data structures are expressed in a markup language.

10. A method as recited in claim 1, wherein the data structures are expressed in XML.

11. A method as recited in claim 1 further comprising:
formatting the message envelope for sending over a network using HTTP;
sending the message envelope to an entity on the network by using HTTP.

12. A method as recited in claim 1 further comprising:
binding the message envelope into a HTTP request;
sending the message envelope to an entity on the network by using HTTP.

13. A method as recited in claim 1 further comprising;
binding the message envelope into a HTTP response;
sending the message envelope to an entity on the network by using HTTP.

14. A method as recited in claim 3, wherein the envelope tags identify the message envelope.

15. A method as recited in claim 5, wherein the header tags identify the header data structure.

16. A method as recited in claim 5, wherein the body tags identify the body data structure.

17. A method as recited in claim 4, wherein the message envelope has the following format:

```
<Envelope label>
    <Header label>
        header data
    </Header label>
    <Body label>
        message data
    </Body label>
</Envelope label>
``` the <Envelope label> being a beginning envelope tag, the </Envelope label> being an ending envelope tag, and the Envelope label identifying the message envelope;
the <Header label> being a beginning header tag, the <Header label> being an ending header tag, the Header label identifying the header data structure;
the <Body label> being a beginning body tag, the </Body label> being an ending body tag, and the Body label identifying the body data structure;
the header data being expressed in XML;
the message data being expressed in XML.

18. A method of delivering a message over a network, the method comprising:
transmitting a message envelope of a message from an origin entity to a destination entity via one or more intermediate entities on the network;
the message envelope having contents comprising data structures, each data structure identifies which entity is intended to process the data structure when that entity receives the message envelope over the network, wherein at least one of the data structures includes an actor attribute specifying the identity of the destination entity and a mandatory attribute indicating that an explicit request for the destination entity to perform a task in the data structure must be understood and processed by the destination entity.

19. A method as recited in claim 18, wherein each data structure specifies whether the entity that is intended to process the data structure must understand such data structure when that entity receives the message envelope over the network.

20. A method as recited in claim 18, wherein:
the message envelope has beginning and ending envelope tags;
the contents of the message envelope is between the envelope tags.

21. A method as recited in claim 18, wherein the contents include:
a header data structure;
a body data structure, the body data structure including message data.

22. A method as recited in claim 21, wherein:
the header data structure has beginning and ending header tags;
the body data structure has beginning and ending body tags.

23. A method as recited in claim 21, wherein:
the header data structure is intended for at least one intermediate entity;
the body data structure is intended for a destination entity.

24. A method as recited in claim 18, wherein the data structures lack executable instructions for performing the task.

25. A method as recited in claim 18, wherein at least one of the data structures includes a request for an intermediate entity to perform a task.

26. A method as recited in claim 18, wherein the data structures are expressed in a markup language.

27. A method as recited in claim 18, wherein the data structures are expressed in XML.

28. A method as recited in claim 18 further comprising:
formatting the message envelope for sending over a network using HTTP;
sending the message envelope to an entity on the network by using HTTP.

29. A method as recited in claim 18 further comprising:
binding the message envelope into a HTTP request;
sending the message envelope to an entity on the network by using HTTP.

30. A method as recited in claim 18 further comprising:
binding the message envelope into a HTTP response;
sending the message envelope to an entity on the network by using HTTP.

31. A method as recited in claim 20, wherein the envelope tags identify the message envelope.

32. A method as recited in claim 22, wherein the header tags identify the header data structure.

33. A method as recited in claim 22, wherein the body tags identify the body data structure.

34. A method as recited in claim 21, wherein the message envelope has the following format:

```
<Envelope label>
    <Header label>
        header data
    </Header label>
    <Body label>
        message data
    </Body label>
</Envelope label>
``` the <Envelope label> being a beginning envelope tag, the </Envelope label> being an ending envelope tag, and the Envelope label identifying the message envelope;

the <Header label> being a beginning header tag, the </Header label> being an ending header tag, the Header label identifying the header data structure;

the <Body label> being a beginning body tag, the </Body label> being an ending body tag, and the Body label identifying the body data structure;

the header data being expressed in XML;

the message data being expressed in XML.

35. A method of parsing a message received by a receiving entity over a network from a sending entity, the method comprising:

parsing a message envelope;

parsing contents of the message envelope, the contents comprising data structures, each data structure identifies which entity is intended to process the data structure when that entity receives the message envelope over the network, wherein at least one of the data structures includes an actor attribute specifying the identity of the receiving entity and a mandatory attribute indicating that an explicit request for the receiving entity to perform a task in the data structure must be understood and processed by the receiving entity.

36. A method as recited in claim 35, wherein each data structure specifies whether the entity that is intended to process the data structure must understand such data structure when that entity receives the message envelope over the network.

37. A method as recited in claim 36 further comprising if the entity that is intended to process the data structure does not understand such data structure, sending a response message to the sending entity that indicates that the entity did not understand such data structure.

38. A method as recited in claim 35 further comprising sending a response message to the sending entity on the network.

39. A method as recited in claim 35, wherein:

the message envelope has beginning and ending envelope tags;

the contents of the message envelope is between the envelope tags.

40. A method as recited in claim 35, wherein the contents include:

a header data structure;

a body data structure, the body data structure including message data.

41. A method as recited in claim 40, wherein:

the header data structure has beginning and ending header tags;

the body data structure has beginning and ending body tags.

42. A method as recited in claim 40, wherein:

the header data structure is intended for at least one intermediate entity;

the body data structure is intended for a destination entity.

43. A method as recited in claim 35, wherein the data structures lack executable instructions for performing the task.

44. A method as recited in claim 35, wherein the data structures are expressed in a markup language.

45. A method as recited in claim 35, wherein the data structures are expressed in XML.

46. A computer-readable storage medium having computer-executable instructions that, when executed by a computer, performs a method of formatting a message for exchange between entities on a network, the method comprising:

generating a message envelope;

generating contents of the message envelope, the contents comprising data structures, each data structure identifies which entity is intended to process the data structure when that entity receives the message envelope over the network, wherein at least one of the data structures includes an actor attribute specifying the identity of that entity and a mandatory attribute indicating that an explicit request for that entity to perform a task in the data structure must be understood and processed by that entity.

47. A computer-readable storage medium having computer-executable instructions that, when executed by a computer, performs a method of delivering a message between entities on a network, the method comprising:

transmitting a message envelope of a message from an origin entity to a destination entity via one or more intermediate entities on the network;

the message envelope having contents comprising data structures, each data structure identifies which entity is intended to process the data structure when that entity receives the message envelope over the network, wherein at least one of the data structures includes an actor attribute specifying the identity of the destination entity and a mandatory attribute indicating that an explicit request for the destination entity to perform a task in the data structure must be understood and processed by the destination entity.

48. A computer-readable storage medium having computer-executable instructions that, when executed by a computer, performs a method of parsing a message received by a receiving entity over a network from a sending entity, the method comprising:

parsing a message envelope of a message;

parsing contents of the message envelope, the contents comprising data structures, each data structure identifies which entity is intended to process the data structure when that entity receives the message envelope over the network, wherein at least one of the data structures includes an actor attribute specifying the identity of the receiving entity and a mandatory attribute indicating that an explicit request for the receiving entity to perform a task in the data structure must be understood and processed by the receiving entity.

49. A message exchange apparatus comprising:
a processor;
a message formatter executable on the processor to:
generate a message envelope;
generate contents of the message envelope, the contents comprising data structures, each data structure identifies which entity is intended to process the data structure when that entity receives the message envelope over the network, wherein at least one of the data structures includes an actor attribute specifying the identity of that entity and a mandatory attribute indicating that an explicit request for that entity to perform a task in the data structure must be understood and processed by that entity.

50. A message exchange apparatus comprising:
a processor;
a message deliverer executable on the processor to:
transmit a message envelope of a message from an origin entity to a destination entity via one or more intermediate entities on the network;
the message envelope having contents comprising data structures, each data structure identifies which entity is intended to process the data structure when that entity receives the message envelope over the network, wherein at least one of the data structures includes an actor attribute specifying the identity of the destination entity and a mandatory attribute indicating that an explicit request for the destination entity to perform a task in the data structure must be understood and processed by the destination entity.

51. A message exchange apparatus comprising:
a processor;
a message parser executable on the processor to:
parse a message envelope of a message;
parse contents of the message envelope, the contents comprising data structures, each data structure identifies which entity is intended to process the data structure when that entity receives the message envelope over the network, wherein at least one of the data structures includes an actor attribute specifying the identity of that entity and a mandatory attribute indicating that an explicit request for that entity to perform a task in the data structure must be understood and processed by that entity.

52. A message envelope generated in accordance with the following acts:
providing a sending entity in communication with a network of entities;
generating contents of the message envelope of a message, the contents comprising:
a header data structure having an actor attribute specifying the identity of an intermediate entity and a mandatory attribute indicating that an explicit request for the intermediate entity to perform a task in the header data structure must be understood and processed by the intermediate entity; and
a body data structure which identifies a destination entity as that which is intended to process the body data structure.

53. A message envelope as recited in claim 52, wherein the data structures are expressed in a markup language.

54. A message envelope as recited in claim 52, wherein the data structures are expressed in XML.

55. A modulated data signal having computer-executable instructions embodied thereon comprising:
a header data structure having an actor attribute specifying the identity of an intermediate entity, over a network of entities, and a mandatory attribute indicating that an explicit request for the intermediate entity to perform a task in the header data structure must be understood and processed by the intermediate entity; and
a body data structure which identifies a destination entity as that which is intended to process the body data structure.

56. A modulated data signal as recited in claim 55, wherein the data structures are expressed in a markup language.

57. A modulated data signal as recited in claim 55, wherein the data structures are expressed in XML.

58. A computer-readable medium having a data structure embodied thereon comprising:
a header data-structure section having an actor attribute specifying the identity of an intermediate entity, over a network of entities, and a mandatory attribute indicating that an explicit request for the intermediate entity to perform a task in the header data-structure section must be understood and processed by the intermediate entity; and
a body data-structure section which identifies a destination entity as that which is intended to process the body data-structure section.

59. A computer-readable medium as recited in claim 58, wherein the data-structure sections are expressed in a markup language.

60. A computer-readable medium as recited in claim 58, wherein the data-structure sections are expressed in XML.

61. A method of formatting a message for exchange between entities on a network, the method comprising:
generating a message envelope of a message, the message comprising at least one explicit request by one entity on a network of another entity on the network to perform a task;
generating contents of the message envelope, the contents comprising data structures, at least one data structure having an actor attribute specifying the identity of that entity indicated in the at least one explicit request and a mandatory attribute indicating that the at least one explicit request for that entity to perform a task in the data structure must be understood and processed by that entity.

62. A method as recited in claim 61, wherein each data structure specifies whether the entity that is intended to process the data structure must understand such data structure.

63. A method as recited in claim 61, wherein each data structure specifies whether the entity that is intended to process the data structure must respond if it does not understand such data structure.

64. A method as recited in claim 61, wherein:
the message envelope has beginning and ending envelope tags;
the contents of the message envelope is between the envelope tags.

65. A method as recited in claim 61, wherein the contents include:
a header data structure;
a body data structure, the body data structure including message data.

66. A method as recited in claim 65, wherein:
the header data structure has beginning and ending header tags;
the body data structure has beginning and ending body tags.

67. A method as recited in claim 65, wherein:
the header data structure is intended for at least one intermediate entity;
the body data structure is intended for a destination entity.

68. A method as recited in claim 61 further comprising sending the message envelope to an entity on a network.

69. A method as recited in claim 61, wherein at least one of the data structures includes a request for an entity to perform a task, wherein the data structures lack executable instructions for performing the task.

70. A method as recited in claim 61, wherein the data structures are expressed in a markup language.

71. A method as recited in claim 61, wherein the data structures are expressed in XML.

72. A method as recited in claim 61 further comprising:
formatting the message envelope for sending over a network using HTTP;
sending the message envelope to an entity on the network by using HTTP.

73. A method as recited in claim 61 further comprising:
binding the message envelope into a HTTP request;
sending the message envelope to an entity on the network by using HTTP.

74. A method as recited in claim 61 further comprising:
binding the message envelope into a HTTP response;
sending the message envelope to an entity on the network by using HTTP.

75. A method as recited in claim 66, wherein the header tags identify the header data structure.

76. A method as recited in claim 66, wherein the body tags identify the body data structure.

* * * * *